United States Patent
Jamieson et al.

(10) Patent No.: US 7,947,176 B1
(45) Date of Patent: May 24, 2011

(54) MEMBRANE FLUID FILTRATION AND REMEDIATION SYSTEM

(75) Inventors: Tom Jamieson, Willis, TX (US); Edward Beverly Moe, Willis, TX (US)

(73) Assignee: Tri-Flo International, Inc., Willis, TX (US)

( * ) Notice: Subject to any disclaimer, the term of this patent is extended or adjusted under 35 U.S.C. 154(b) by 0 days.

(21) Appl. No.: 12/949,900

(22) Filed: Nov. 19, 2010

Related U.S. Application Data

(60) Provisional application No. 61/285,702, filed on Dec. 11, 2009.

(51) Int. Cl.
*C02F 1/02* (2006.01)
*C02F 9/10* (2006.01)
*C02F 1/00* (2006.01)

(52) U.S. Cl. .............. 210/321.6; 210/202; 210/209; 210/241; 210/242.1; 210/258; 210/182

(58) Field of Classification Search .......... 210/143, 210/175, 177, 178, 179, 182, 202, 207, 208, 210/209, 241, 242.1, 252, 258, 259, 294, 210/319, 512.1, 512.2, 519, 520; 166/75.11; 175/206, 207, 217, 218; 196/14.52, 46.1; 208/390
See application file for complete search history.

(56) References Cited

U.S. PATENT DOCUMENTS

| | | | | |
|---|---|---|---|---|
| 4,846,976 A | * | 7/1989 | Ford | 210/636 |
| 5,173,195 A | * | 12/1992 | Wright et al. | 210/802 |
| 5,932,091 A | * | 8/1999 | Tompkins et al. | 210/97 |
| 7,727,389 B1 | * | 6/2010 | Mallonee et al. | 210/182 |
| 7,731,840 B1 | * | 6/2010 | Mallonee et al. | 210/143 |
| 2003/0136747 A1 | * | 7/2003 | Wood et al. | 210/774 |
| 2005/0040119 A1 | * | 2/2005 | Kulbeth | 210/806 |
| 2007/0163959 A1 | * | 7/2007 | Cote et al. | 210/650 |

* cited by examiner

*Primary Examiner* — Krishnan S Menon
(74) *Attorney, Agent, or Firm* — Buskop Law Group, PC; Wendy Buskop

(57) ABSTRACT

A filtration and remediation system is disclosed herein including a quiet tank component, a circulation component, and a storage and filtration component, each with frames. The system can include a scalping shaker which can receive a slurry and separate a particulate from the slurry, forming an effluent. A tank can receive the effluent and a weir can remove oil from the effluent, forming a cleaned effluent. A second weir can discharge the cleaned effluent. The circulation component can include a tank and an absorbent material. The absorbent material can receive the cleaned effluent and remove oil from the cleaned effluent, forming a circulation effluent. A sludge can settle within the circulation tank from the circulation effluent, forming a cleaned circulation stream. The storage and filtration component can include a filtration membrane which can receive and separate the cleaned circulation stream into a clean permeate and a dirty concentrate.

20 Claims, 4 Drawing Sheets

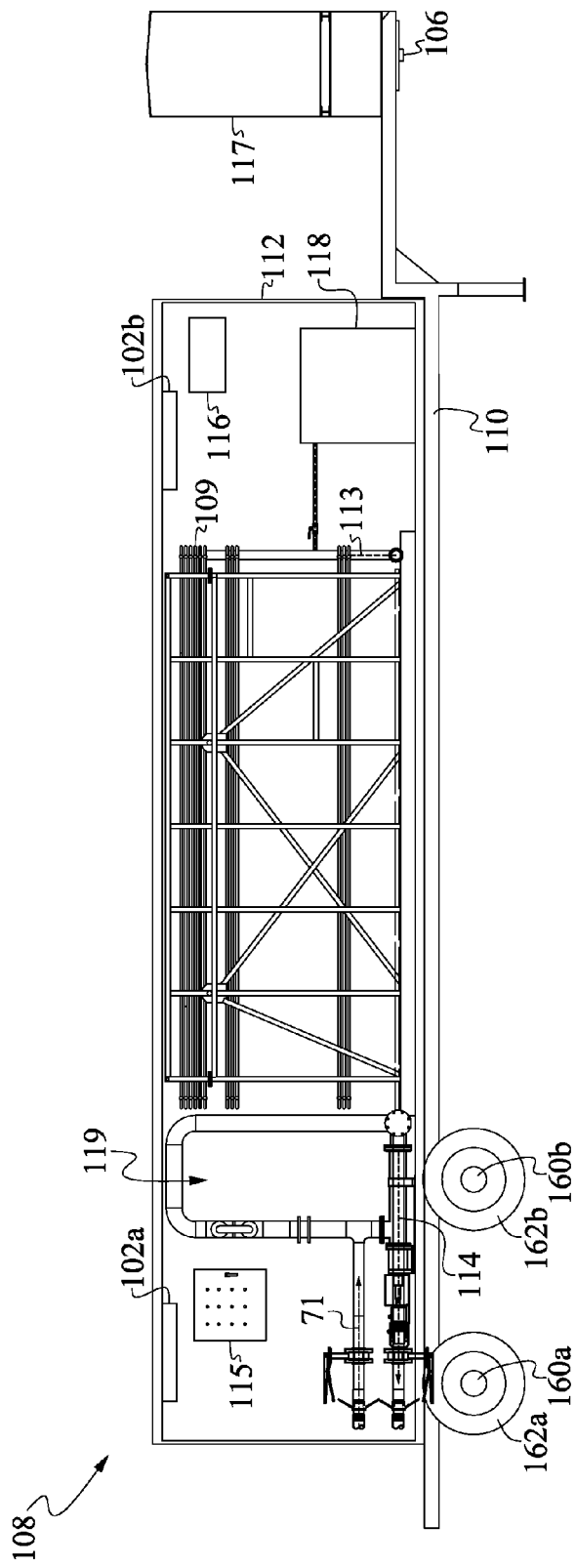
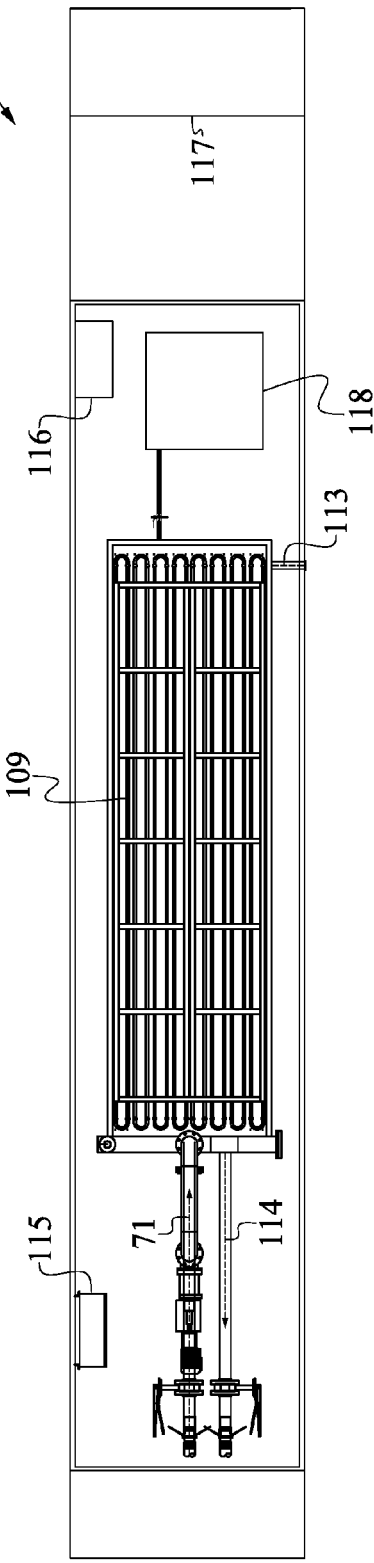
FIGURE 2
FIGURE 3

MEMBRANE FLUID FILTRATION AND REMEDIATION SYSTEM

CROSS REFERENCE TO RELATED APPLICATIONS

The present application claims priority and the benefit of co-pending U.S. Provisional Application Ser. No. 61/285,702 filed on Dec. 11, 2009, entitled "MEMBRANE FLUID FILTRATION AND REMEDIATION SYSTEM". This reference is incorporated herein in its entirety.

FIELD

The present embodiments generally relate to a membrane fluid filtration and remediation system. The system can be portable, modular, containerizable, and can be able to traverse conventional roadways without the need for special permits.

BACKGROUND

A need exists for an oil, water, and particulate filtration and remediation system that can produce a clean aqueous discharge using modular equipment.

A further need exists for an oil, water, and particulate filtration and remediation system that can produce a minimal footprint.

The present embodiments meet these and other needs.

BRIEF DESCRIPTION OF THE DRAWINGS

The detailed description will be better understood in conjunction with the accompanying drawings as follows:

FIG. 2 is a side view of a storage and filtration component.

FIG. 3 is a top view of the storage and filtration component.

Figure 1A:
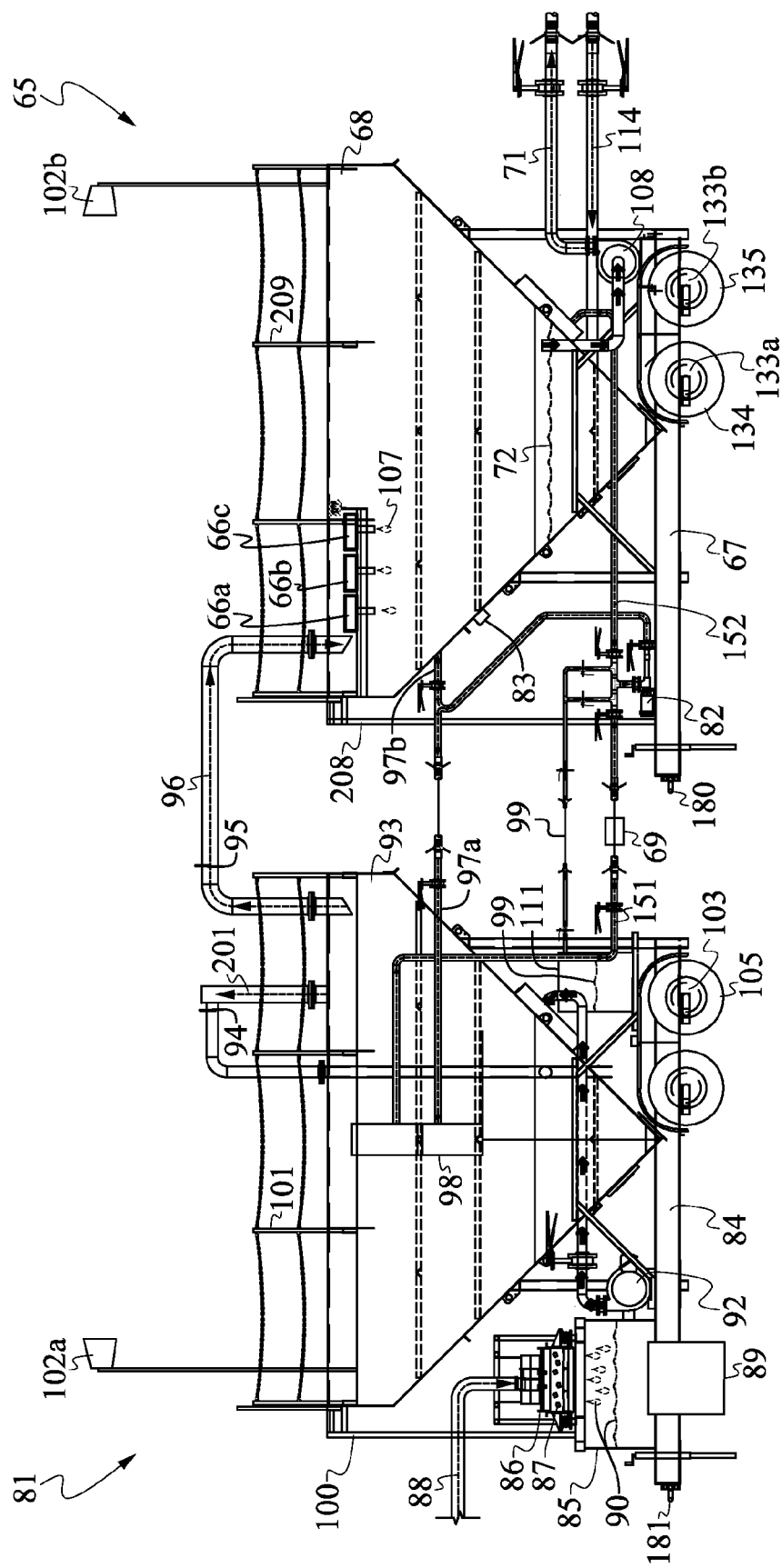
FIG. 1A is a side view of a circulation component and a quiet tank component.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a membrane fluid filtration and remediation system. Embodiments of the membrane fluid filtration and remediation system can be portable, modular, containerizable, explosion resistant, or combinations thereof.

The membrane fluid filtration and remediation system can include a quiet tank component, a circulation component, and a storage and filtration component. Each of which can be portable, modular, containerizable, explosion resistant, or combinations thereof.

The quiet tank component can have a first frame. The first frame can be moveable and can be a trailer frame having two parallel channel steel bars connected at a point with a trailer hitch. The first frame can include axles and wheels for ease of movement.

A filtration system scalping shaker can be disposed on the first frame. The filtration system scalping shaker can receive an initial slurry. An example of a filtration system scalping shaker usable with the system can be those available from Tri-Flo International, Inc. of Willis, Tex.

In embodiments, an initial slurry can be produced water, waste water, or oily waste water. The initial slurry can be oil and water, water and a contaminate, oil and another fluid, or combinations thereof. The initial slurry can include various sized particulates.

For example, the membrane fluid filtration and remediation system can be used at waste disposal sites to produce a clean aqueous discharge.

The initial slurry can flow through the filtration system scalping shaker. The filtration system scalping shaker can separate a first filtration particulate from the initial slurry, which can form a first filtration effluent. The first filtration particulate can have a diameter of at least seventy microns. The first filtration particulate can then flow from the filtration system scalping shaker to a cuttings box.

The first filtration effluent can flow from the filtration system scalping shaker to a first tank.

A first pump, such as a centrifugal pump, can pump the first filtration effluent from the first tank into a second tank.

The second tank can have a first adjustable weir for removing free oil from the first filtration effluent, which can form a cleaned effluent. The second tank can have a second adjustable weir for discharging the cleaned effluent from the second tank. The first and second adjustable weirs can be in parallel.

The membrane fluid filtration and remediation system can include a circulation component. The circulation component can include a second frame, which can be moveable. The second frame can be a channel steel trailer frame supported by axles and wheels.

A circulation tank can be disposed on the second frame. The circulation tank can be in fluid communication with the second adjustable weir for receiving the cleaned effluent from the second tank. The cleaned effluent can be transferred from the second tank to the circulation tank using a hydrostatic pressure of the second tank.

Embodiments of the membrane fluid filtration and remediation system can have a polymer injector for introducing polymer into the circulation tank, the second tank, or combinations thereof. During a shutdown of the circulation component, the quiet component, or combinations thereof the polymer can be introduced into either or both of the tanks. In embodiments, the polymer can be a polyacrylamide.

The polymer can be blended with any remaining clean effluent, which can allow for a fast and easy method for cleaning the tanks.

The introduced polymer can form a flocculated material when the polymer blends with the remaining clean effluent. The polymer can be injected through a feed transfer pipe into each tank. The feed transfer pipe can circulate the flocculated material into the cleaned effluent remaining in the circulation tank, which can agitate the flocculated materials so that even small particles of oil can be captured by the polymer.

A static mixer can be in fluid communication with the circulation tank and the second tank. The polymer can flow through the static mixer. The static mixer can blend the clean effluent with the polymer, which can form a cleaned stream and a first sludge.

An injection pump can be used to pressure feed the polymer from a polymer tank to the static mixer.

An absorbent material, such as a hydrocarbon absorbent material, can be disposed on the circulation component over the circulation tank. The absorbent material can be recyclable, pillow shaped, or combinations thereof.

As the clean effluent flows from the second tank to the circulation tank, the clean effluent can pass through the absorbent material, and the absorbent material can remove or filter free oil from the cleaned effluent, which can form a circulation effluent.

In embodiments, the free oil absorbed into the absorbent material can be removed, such as by applying pressure to the absorbent material; thereby allowing recycling and continued use of the absorbent material.

Within the circulation tank, a sludge can settle out of the circulation effluent, which can form a clean circulation stream.

The membrane fluid filtration and remediation system can include a storage and filtration component, which can be framed and portable. The storage and filtration component can be in fluid communication with the circulation component.

The clean circulation stream can flow from the circulation tank to the storage and filtration component. A discharge pump can be used to pump the clean circulation stream from the circulation tank to the storage and filtration component.

An ultra-filtration membrane can be disposed in the storage and filtration component, and the ultra-filtration membrane can receive the clean circulation stream from the circulation tank. The ultra-filtration membrane can filter out particulates and other contaminates from the clean circulation stream, which can form a clean permeate and a dirty concentrate.

The dirty concentrate can be pumped or can otherwise flow back to the circulation tank for further processing. The clean permeate can be injected into a well to be used as a frac fluid, can be disposed of, or can be stored for later use.

The storage and filtration component can have a container. The container can be a standard shipping container, such as an eight feet and six inches wide by twenty feet long shipping container. A third frame of the storage and filtration component can partially form the container. The third frame can have axles and wheels.

A control box can be disposed in or on the container and can be in communication with the quiet tank component, the circulation component, or the storage and filtration component.

The control box can actuate and shut down the quiet tank component, the circulation component, and the storage and filtration component.

A heater can be disposed in the container for warming the container and preventing components of the container from freezing.

A power source, such as a generator, can be located proximate to the container for providing power to the quiet tank component, the circulation component, and the storage and filtration component.

A cleaning system, such as a closed cell ball detergent cleaning system, can be disposed in the container and can be in fluid communication with the ultra-filtration membrane. Upon a shutdown of the storage and filtration component, the closed cell ball detergent cleaning system can be used to clean the ultra-filtration membrane. In embodiments, the cleaning system can be remotely actuated.

A storage area can be disposed in the container, which can allow the storage and filtration component to act as a carrier of spare parts, tires, additional equipment, and other items.

Fluid communication can be provided between the quiet tank component, the circulation component, and the storage and filtration component for operation at a work site. When work is completed at the work site, the fluid communication can be easily disconnected, allowing for transport of the components.

In embodiments, the circulation tank and the second tank can be cone shaped tanks In embodiments, a second injector can be in fluid communication with the circulation tank. The second injector can be used to introduce bentonite, barite, or a pH modifier to the circulation tank.

In one or more embodiments, the various pumps used with the components can be centrifugal pumps, vertical direct pumps, or combinations thereof. In one or more embodiments, the components can be skid mounted.

In one or more embodiments, the storage and filtration component can have one or more of the following: a handrail connected to the third frame, illuminating lights connected to the third frame and to the control box, a ladder connected to the third frame, and a pintel hitch connected to the third frame.

In one or more embodiments, a clean out hatch can be disposed on at least one of the various tanks of the system, providing access for cleaning the tanks.

Turning now to the Figures, FIG. 1A is a side view of the quiet tank component 81 and the circulation component 65.

The quiet tank component 81 is shown having a first frame 84 with a first hitch 181, depicted as a pintel hitch.

A filtration system scalping shaker 86 can be in fluid communication with a first tank 85. The filtration system scalping shaker 86 can receive an initial slurry 88. The filtration system scalping shaker 86 can separate a first filtration particulate 87 from the initial slurry 88, forming a first filtration effluent 90.

The first filtration effluent 90 can contain some oil and some particulate of a smaller diameter than the first filtration particulate 87.

The first filtration particulate 87, which can have a diameter of at least seventy microns, can flow to a cuttings box 89. The first filtration effluent 90 can flow from the filtration system scalping shaker 86 into the first tank 85.

A first filtration pump 92 can be in fluid communication with the first tank 85. The first filtration pump 92 can pump the first filtration effluent 90 from the first tank 85 into a second tank 93. The first filtration pump 92 can be a centrifugal pump.

The second tank 93 can receive the first filtration effluent 90. The second tank 93 can process the first filtration effluent 90 through a first adjustable weir 94. The first adjustable weir 94 can remove free oil 201 from the first filtration effluent 90. A second adjustable weir 95, which can be in parallel with the first adjustable weir 94, can be used to discharge a cleaned effluent 96 from the second tank 93.

The quiet tank component 81 is also shown having a first handrail 101, a first illuminating light 102a, a first ladder 100, a first axle 103, and a first wheel 105.

The circulation component 65 can have a circulation tank 68. The circulation tank 68 can be in fluid communication with the second adjustable weir 95. The circulation tank 68 can receive the cleaned effluent 96.

The cleaned effluent 96 can flow from the second adjustable weir 95 to a plurality of absorbent materials 66a, 66b, and 66c disposed over the circulation tank 68. The plurality of absorbent materials 66a-66c can remove free oil to form a circulation effluent 107. The circulation effluent 107 can flow into the circulation tank 68.

The circulation component 65 is shown having a second frame 67, a second illuminating light 102b, a second handrail 209, a second ladder 208, a second hitch 180, a clarifier first axle 133a, a clarifier second axle 133b, a clarifier first wheel 134, and a clarifier second wheel 135.

A sludge 72 can settle from the circulation effluent 107 within the circulation tank 68, forming a clean circulation stream 71.

The circulation component 65 can include a discharge pump 108, which can be a centrifugal pump. The discharge pump 108 can be in fluid communication with the circulation tank 68. The discharge pump 108 can pump the clean circulation stream 71 from the circulation tank 68 to the storage and filtration component.

As the discharge pump 108 pumps the clean circulation stream 71 from the circulation tank 68 to the storage and filtration component, the discharge pump can cause the circulation effluent 107 to circulate within the circulation tank 68. The circulation of the circulation effluent 107 can cause the sludge 72 to settle, further forming the clean circulation stream 71.

The circulation tank 68 is shown receiving a dirty concentrate 114, which can be received from the storage and filtration component. As such, repeated treatment of fluid in the circulation tank 68 can be performed.

A second injector 83 is shown in fluid communication with the circulation tank 68. The second injector 83 can be used to inject bentonite, barite, a pH modifier, or another material into the circulation tank 68.

During a shutdown of the circulation component 65 and the quiet tank component 81, a polymer 99 can be introduced to the second tank 93 and the circulation tank 68 from a polymer source 111 through ports 97a and 97b. The polymer 99 can blend with any remaining cleaned effluent 96 or circulation effluent 107 within the respective tanks, and can form flocculated materials 151 and 152. The flocculated materials 151 and 152 can flow from the second tank 93 and the circulation tank 68 respectively, can blend with the polymer 99, and can flow back into the second tank 93 and the circulation tank 68 for further cleaning.

A still pipe 98 can be disposed in the second tank 93. The still pipe 98 can facilitate the circulation of the polymer 99 and the flocculated materials 151 and 152 into the cleaned effluent 96 remaining in the second tank 93.

The circulation tank 68 and the second tank 93 can be in fluid communication with a static mixer 69. The static mixer 69 can facilitate blending within the each tank, and blending of the polymer 99.

A polymer injector 82 can be used to introduce the polymer 99 into the circulation tank 68 and the second tank 93 under pressure.

Figure 1B:
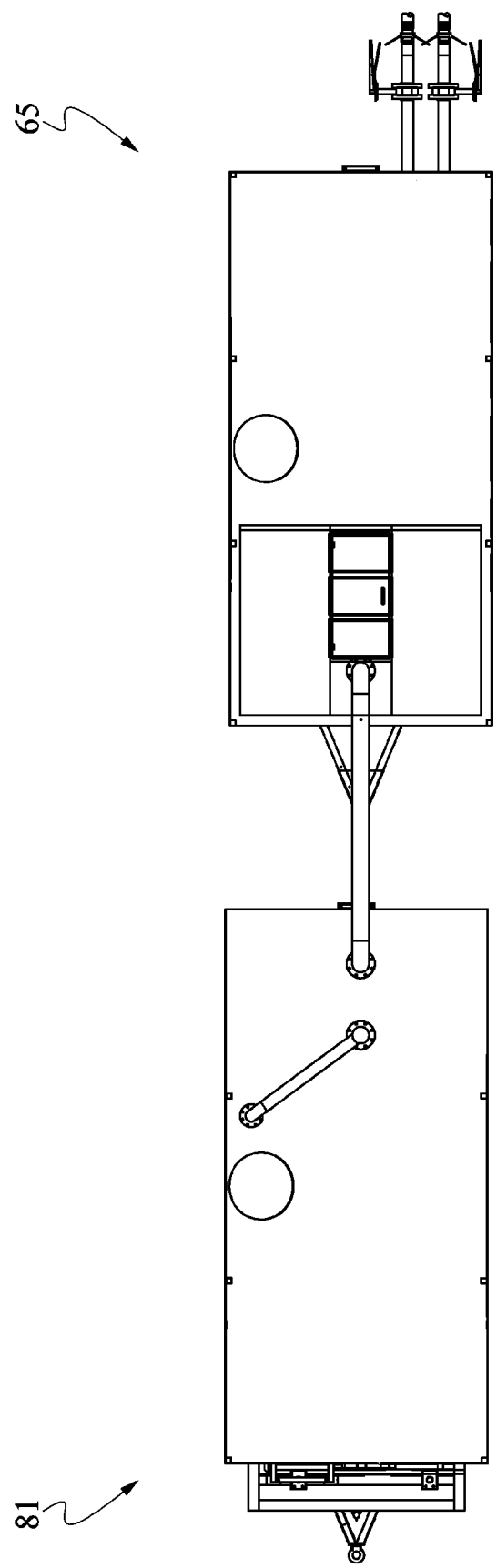
FIG. 1B is a top view of the circulation component and the quiet tank component.

FIG. 1B shows a top view of the quiet tank component 81 and the circulation component 65.

FIG. 2 shows a side view of the storage and filtration component 108.

The storage and filtration component 108 is shown with a container 112, which can be an explosion resistant container. The container 112 is shown partially formed by a third frame 110.

An ultra-filtration membrane 109 is shown disposed on the third frame 110 in the sides that form the container 112.

The storage and filtration component 108, which can be in fluid communication with the circulation tank, is shown receiving the clean circulation stream 71 from the circulation component.

The ultra-filtration membrane 109 can receive the clean circulation stream 71. The ultra-filtration membrane 109 can separate the clean circulation stream 71 into a clean permeate 113 and a dirty concentrate 114. The dirty concentrate 114 can be pumped or can otherwise flow back to the circulation tank for further processing.

Also shown is a control box 115 which can be used to actuate and shut down the quiet tank component, the circulation component, and the storage and filtration component 108. The control box 115 can actuate or shut down the components in series, in pairs, or simultaneously.

A heater 116 is shown disposed in the container 112 for warming within the container 112.

A power source 117 is shown for operating the quiet tank component, the circulation component, and the storage and filtration component 108.

A closed cell ball detergent cleaning system 118 is shown disposed in the container 112 and in fluid communication with the ultra-filtration membrane 109. The closed cell ball detergent cleaning system 118 can be remotely actuated and can clean the ultra-filtration membrane 109, such as upon a shutdown of the storage and filtration component 108.

Also shown are a storage area 119, axles 160a and 160b, and wheels 162a and 162b. A kingpin 106 is shown that allows the storage and filtration component 108 to be towed by a tow vehicle.

Illuminating lights 102a and 102b are also shown.

FIG. 3 is a top view of the storage and filtration component 108. The clean permeate 113, the cleaned circulation stream 71, the dirty concentrate 114, the control box 115, the heater 116, the power source 117, the closed cell ball detergent cleaning system 118, and the ultra-filtration membrane 109 are all shown.

Figure 4:
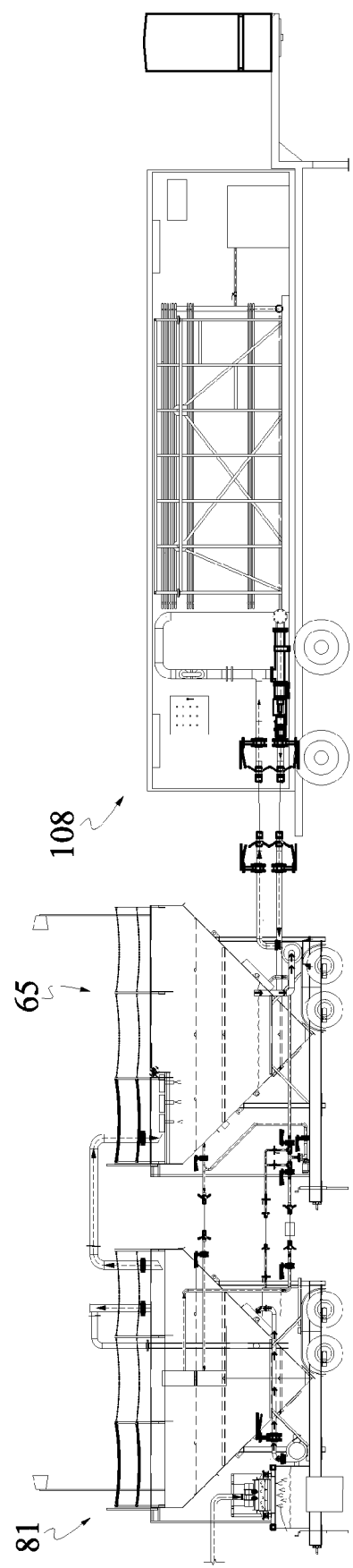
FIG. 4 is a side view of the circulation, quiet tank, and storage and filtration components assembled.

FIG. 4 is a side view of the quiet tank component 81, the circulation component 65, and the storage and filtration component 108 all in fluid communication.

While these embodiments have been described with emphasis on the embodiments, it should be understood that within the scope of the appended claims, the embodiments might be practiced other than as specifically described herein.

What is claimed is:

1. A membrane fluid filtration and remediation system comprising:
   a. a quiet tank component comprising:
      (i) a first frame;
      (ii) a scalping shaker, wherein the scalping shaker receives an initial slurry and separates a first particulate from the initial slurry to form a first effluent;
      (iii) a cuttings box in fluid communication with the scalping shaker, wherein the first particulate flows into the cuttings box;
      (iv) a first tank in fluid communication with the scalping shaker, wherein the first effluent flows into the first tank;
      (v) a first pump in fluid communication with the first tank, wherein the first pump pumps the first effluent from the first tank to a second tank disposed on the first frame;
      (vi) a first adjustable weir disposed in the second tank for removing free oil from the first effluent to form a cleaned effluent; and
      (vii) a second adjustable weir for discharging the cleaned effluent from the second tank;
   b. a circulation component comprising:
      (i) a second frame;
      (ii) a circulation tank disposed on the second frame;
      (iii) an absorbent material disposed over the circulation tank, wherein the absorbent material receives the cleaned effluent from the second adjustable weir and removes free oil from the cleaned effluent to form a circulation effluent, and wherein a first sludge settles within the circulation tank from the circulation effluent forming a cleaned circulation stream; and (iv) a discharge pump in fluid communication with the circulation tank, wherein the discharge pump pumps the cleaned circulation stream from the circulation tank; and c. a storage and filtration component comprising:
(i) a third frame;
(ii) a container at least partially formed by the third frame;
(iii) an ultra-filtration membrane disposed on the third frame and in fluid communication with the discharge pump, wherein the ultra-filtration membrane receives the cleaned circulation stream and separates the cleaned circulation stream into a clean permeate and a dirty concentrate;
(iv) a control box disposed in the container for actuating and shutting down the quiet tank component, the circulation component, and the storage and filtration component;
(v) a heater disposed in the container for warming the container;
(vi) a power source in communication with the control box;
(vii) a closed cell ball detergent cleaning system disposed in the container and in fluid communication with the ultra-filtration membrane for cleaning the ultra-filtration membrane; and
(viii) a storage area disposed in the container.

2. The system of claim 1, further comprising a polymer port in fluid communication with the second tank for introducing a polymer to the second tank, wherein the polymer blends with the cleaned effluent to form a first flocculated material.

3. The system of claim 2, wherein the polymer is a polyacrylamide.

4. The system of claim 2, further comprising a still pipe disposed in the second tank, wherein the still pipe circulates the first flocculated material into cleaned effluent in the second tank.

5. The system of claim 2, further comprising a polymer port in fluid communication with the circulation tank, wherein the polymer port introduces the polymer to the circulation tank, and wherein the polymer blends with the circulation effluent to form a second flocculated material.

6. The system of claim 5, further comprising:
a. a static mixer in fluid communication with the second tank and the circulation tank, wherein the static mixer facilitates blending of the polymer within the second tank and the circulation tank; and
b. a polymer injector, wherein the polymer injector introduces the polymer into the second tank and the circulation tank.

7. The system of claim 1, further comprising a second injector in fluid communication with the circulation tank, wherein the second injector introduces to the circulation tank a member of the group consisting of: bentonite, barite, and a pH modifier.

8. The system of claim 1, wherein the absorbent material is a recyclable hydrocarbon absorbent material comprising a plurality of pillow shaped materials that are squeezable, and wherein the plurality of pillow shaped materials remove absorbed hydrocarbons.

9. The system of claim 1, wherein the first pump and the discharge pump are centrifugal pumps, vertical direct pumps, or combinations thereof.

10. The system of claim 1, wherein each frame has at least one axle and at least two wheels, and wherein the axles and wheels provide ease of movement during transportation of the frames.

11. The system of claim 1, wherein each frame comprises a member of the group consisting of: a handrail, an illuminating light, a ladder, a hitch, and combinations thereof.

12. The system of claim 1, wherein the power source is a generator disposed outside of the container.

13. The system of claim 1, wherein the storage and filtration component further comprises a dirty discharge outlet in fluid communication with the circulation tank, wherein the dirty discharge outlet flows the dirty concentrate from the storage and filtration component to the circulation tank.

14. The system of claim 1, wherein the control box is configured to actuate and shut down the quiet tank component, the circulation component, and the storage and filtration component in series, in pairs, or simultaneously.

15. A membrane fluid filtration and remediation system, the system comprising:
a. a quiet tank component comprising:
(i) a first frame;
(ii) a scalping shaker, wherein the scalping shaker receives an initial slurry and separates a first particulate from the initial slurry to form a first effluent;
(iii) a first tank in fluid communication with the scalping shaker, wherein the first effluent flows into the first tank from the scalping shaker;
(iv) a first pump in fluid communication with the first tank, wherein the first pump pumps the first effluent from the first tank to a second tank disposed on the first frame;
(v) a first weir disposed in the second tank, wherein the first weir removes free oil from the first effluent to form a cleaned effluent; and
(vi) a second weir disposed in the second tank, wherein the second weir discharges the cleaned effluent from the second tank;
b. a circulation component comprising:
(i) a second frame;
(ii) a circulation tank disposed on the second frame;
(iii) an absorbent material disposed over the circulation tank, wherein the absorbent material removes free oil from the cleaned effluent to form a circulation effluent in the circulation tank, and wherein a first sludge settles from the circulation effluent in the circulation tank to form a cleaned circulation stream; and
(iv) a discharge pump in fluid communication with the circulation tank, wherein the discharge pump pumps the cleaned circulation stream from the circulation tank; and
c. a storage and filtration component comprising:
(i) a third frame;
(ii) a container; and
(iii) an ultra-filtration membrane disposed in the container and in fluid communication with the circulation tank, wherein the ultra-filtration membrane receives the cleaned circulation stream and separates the cleaned circulation stream into a clean permeate and a dirty concentrate.

16. The system of claim 15, wherein the storage and filtration component further comprises a dirty discharge outlet in fluid communication with the circulation tank, wherein the dirty discharge outlet flows the dirty concentrate from the storage and filtration component to the circulation tank.

17. The system of claim 15, wherein each frame has at least one axle and at least two wheels, wherein the axles and wheels provide ease of movement during transportation of the frames.

18. A membrane fluid filtration and remediation system, the system comprising:
  a. a quiet tank component comprising:
    (i) a first frame;
    (ii) a scalping shaker for receiving an initial slurry and separating a first particulate from the initial slurry forming a first effluent;
    (iii) a first tank in fluid communication with the scalping shaker, wherein the first effluent flows from the scalping shaker into the first tank;
    (iv) a second tank disposed on the first frame and in fluid communication with the first tank, wherein the first effluent flows from the first tank to the second tank;
    (v) a first weir disposed in the second tank, wherein the first weir removes free oil from the first effluent forming a cleaned effluent; and
    (vi) a second weir disposed in the second tank, wherein the second weir discharges the cleaned effluent from the second tank; and
  b. a circulation component comprising:
    (i) a second frame;
    (ii) a circulation tank disposed on the second frame; and
    (iii) an absorbent material disposed over the circulation tank, wherein the absorbent material receives the cleaned effluent from the second tank and removes free oil from the cleaned effluent forming a circulation effluent, wherein the circulation effluent flows from the absorbent material into the circulation tank, and wherein a sludge settles from the circulation effluent within the circulation tank forming a cleaned circulation stream; and
  c. a storage and filtration component comprising:
    (i) a third frame;
    (ii) a container on the third frame;
    (iii) an ultra-filtration membrane disposed in the container and in fluid communication with the circulation tank, wherein the cleaned circulation stream flows from the circulation tank to the ultra-filtration membrane, and wherein the ultra-filtration membrane separates the cleaned circulation stream into a clean permeate and a dirty concentrate; and
    (iv) a dirty discharge outlet in fluid communication with the circulation tank, wherein the dirty discharge outlet flows the dirty concentrate from the storage and filtration component to the circulation tank.

19. The system of claim 18, wherein each frame has at least one axle and at least two wheels, and wherein the axles and wheels provide ease of movement during transportation of the frames.

20. The system of claim 18, further comprising a second injector in fluid communication with the circulation tank, wherein the second injector introduces to the circulation tank a member of the group consisting of: bentonite, barite, and a pH modifier.

* * * * *